No. 625,765. Patented May 30, 1899.
T. HILL.
DUMPING VEHICLE.
(Application filed Nov. 2, 1898.)
(No Model.) 4 Sheets—Sheet 1.

No. 625,765. Patented May 30, 1899.
T. HILL.
DUMPING VEHICLE.
(Application filed Nov. 2, 1898.)
(No Model.) 4 Sheets—Sheet 2.
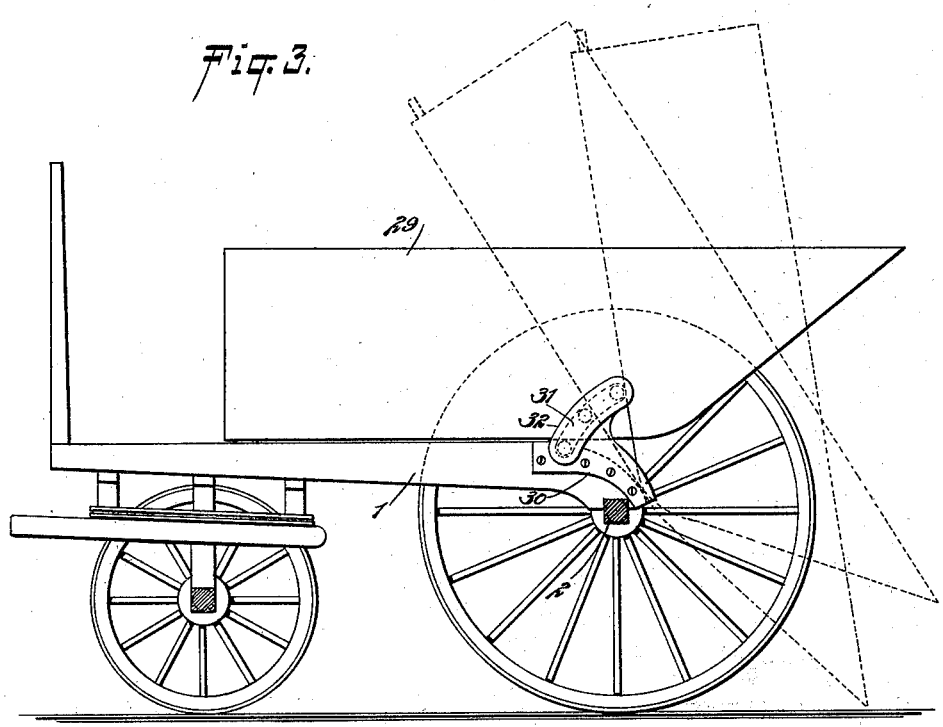
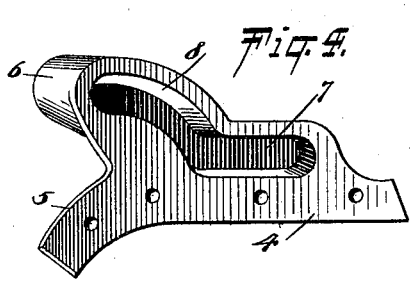
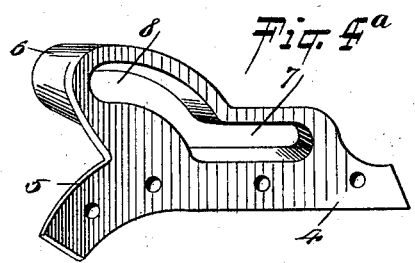
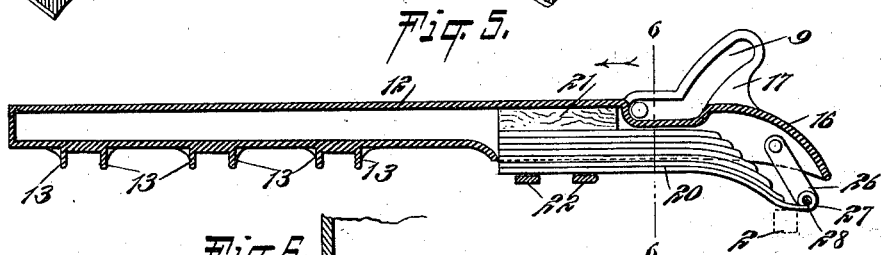
WITNESSES:
William P. Gaebel
C. R. Ferguson
INVENTOR
T. Hill
BY
Munn
ATTORNEYS.

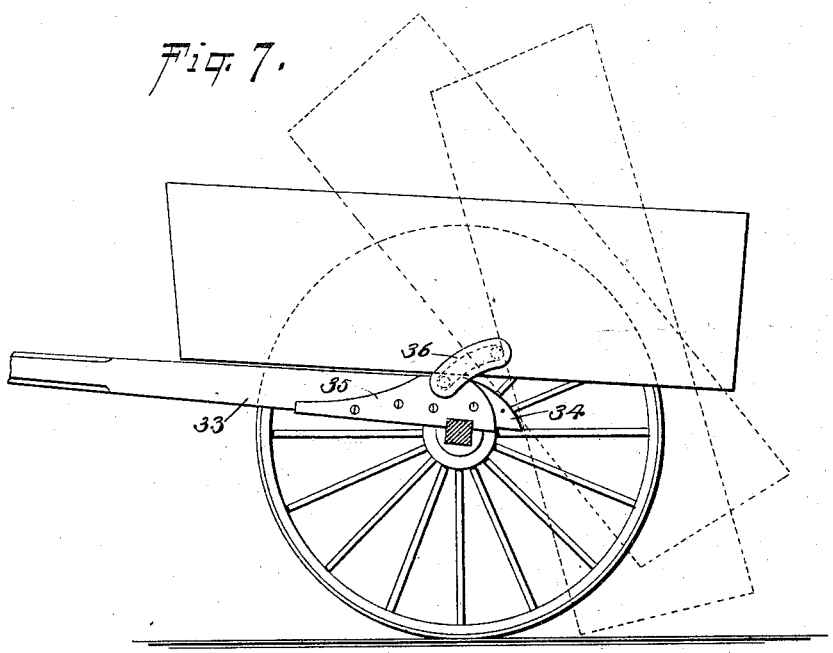
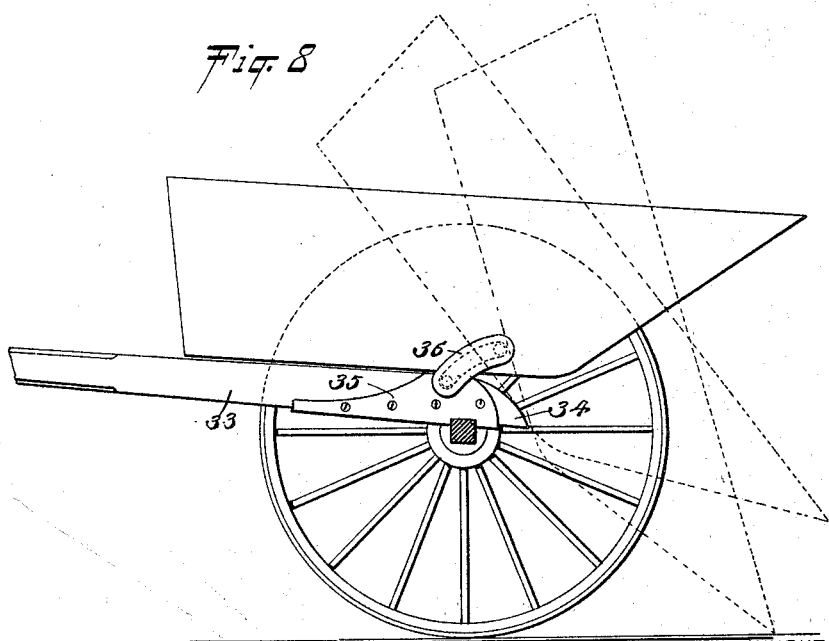

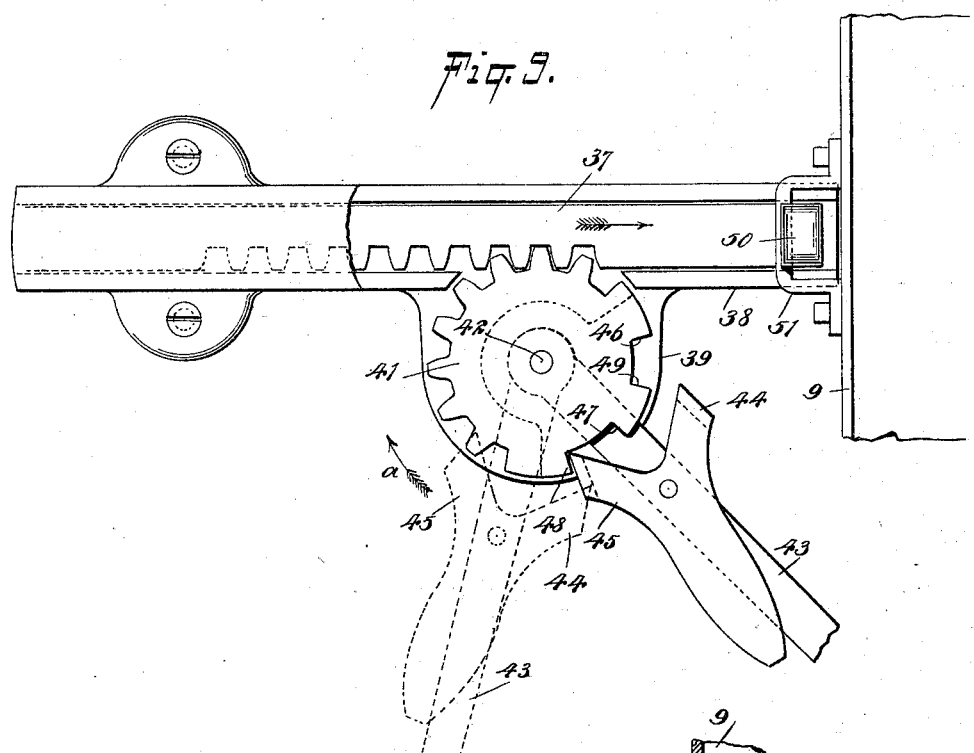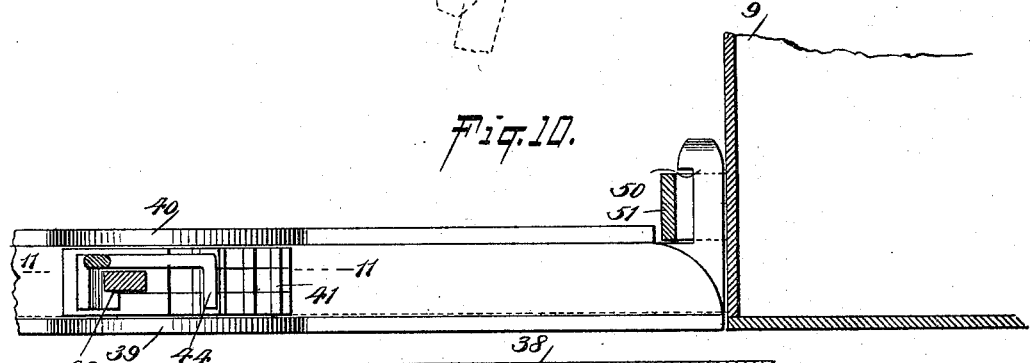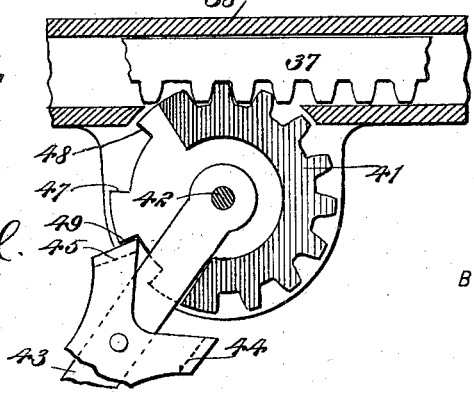

UNITED STATES PATENT OFFICE.

THOMAS HILL, OF JERSEY CITY, NEW JERSEY.

DUMPING-VEHICLE.

SPECIFICATION forming part of Letters Patent No. 625,765, dated May 30, 1899.

Application filed November 2, 1898. Serial No. 695,305. (No model.)

*To all whom it may concern:*

Be it known that I, THOMAS HILL, of Jersey City, in the county of Hudson and State of New Jersey, have invented a new and Improved Dumping-Vehicle, of which the following is a full, clear, and exact description.

This invention relates to improvements in dumping-vehicles of either the four-wheeled type, the two-wheeled type for carrying material in bulk, or the platform type for carrying lumber, bar-iron, or the like.

The object of the invention is to provide a new and simple device to prevent the usual sudden blow ordinarily received by the body of the vehicle when it comes in contact with the ground during the operation of dumping and which is caused by the body rolling and sliding over the curved portion of the wagon-frame. To accomplish this object, I provide a compensating curved upper bearing partially overhanging the lower curved bearing upon the vehicle-frame and a rolling shaft attached to the body, the ends of the shaft being adapted to revolve or slide in the upwardly-curved bearings overhanging the downwardly-curved bearings of the frame, so that while the body is in the act of dumping and changing its center of gravity on the lower curved portion of the frame it will travel up the overhanging portion above and prevent the possibility of the body sliding on the lower curved portion of the frame and striking the ground with a sudden jar.

I will describe a dumping-vehicle embodying my invention and then point out the novel features in the appended claims.

Reference is to be had to the accompanying drawings, forming a part of this specification, in which similar characters of reference indicate corresponding parts in all the views.

Figure 1:
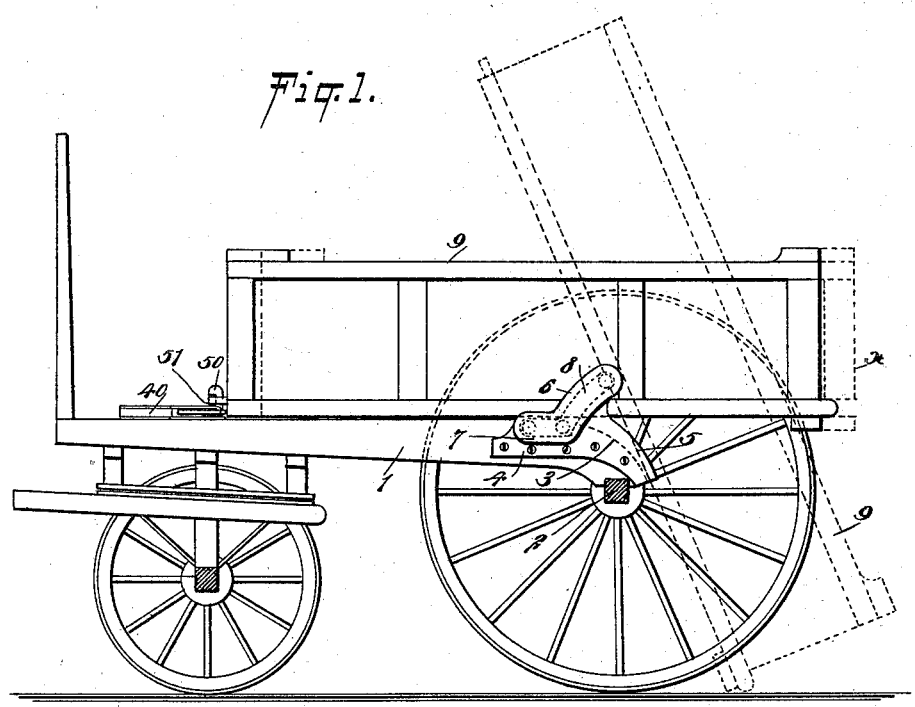
Figure 2:
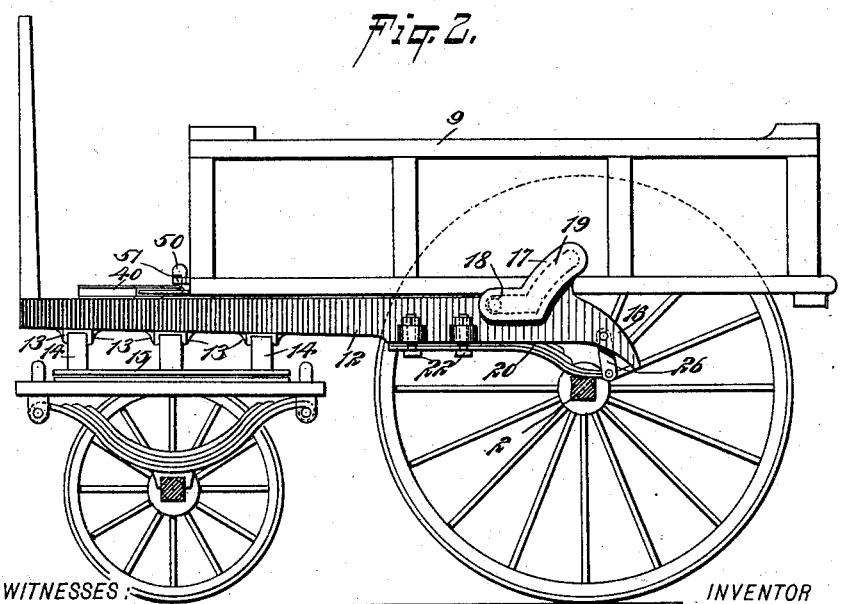

Figure 1 is a side elevation of a dumping-vehicle of the four-wheeled type, embodying my invention. Fig. 2 is a side elevation of a modification. Fig. 3 is a similar view of another modification. Fig. 4 is a perspective view of a compensating bearing employed. Fig. 4ª is a perspective view showing a modified form of compensating bearing. Fig. 5 is a longitudinal section of a frame-bar and bearing illustrated in Fig. 2, and also showing the spring in side elevation. Fig. 6 is a sectional view on the line 6 6 of Fig. 5. Fig. 7 is a side elevation of a modified form of my invention as applied to a cart having a body with a straight rear end. Fig. 8 is a view similar to Fig. 7, but showing the body of the cart with an inclined rear end. Fig. 9 is a plan view of a body locking and sliding device employed. Fig. 10 is a sectional side elevation thereof, and Fig. 11 is a horizontal section on the line 11 11 of Fig. 10.

Referring to the example of my improvement shown in Fig. 1, 1 designates one of the side bars of the gearing-frame, having its rear end attached to the rear axle 2 and having the upper portion of its rear end curved downward, as indicated by the dotted line 3. Attached to the outer side of each side bar at its rear end is the compensating bearing, consisting of a casting having a plate portion 4 secured to the side bar and having a portion 5 extended above the plane of the curve 3 of the bar. This casting has an offset 6, which extends outward and is provided with a horizontally-disposed guide-slot 7 and an upwardly and rearwardly inclined guide-slot 8. This guide-slot 7 may extend entirely through the casting, as indicated in Fig. 4ª, or it may be closed at its outer end, as indicated in Fig. 4, to prevent any possible entrance of dirt. It will be noted that the guide-slots 7 and 8 join, and that the junction of the two slots is considerably forward of the axle 2, and that the upper end of the slot 8 is substantially in a vertical line with said axle.

The body 9 has laterally-projecting trunnions adapted to move in the slots in the castings. I have here shown a rod 10, mounted to rotate in stirrups 11, secured to the bottom of the body. It is to be understood, however, that trunnions may be rigidly attached to the body and projected into the slots without departing from the spirit of my invention.

In operation the body 9 is first to be moved rearward to the position substantially indicated by the dotted line *x*. This will bring the trunnions to the junction of the slots 7 and 8, and at this time the body will be tilted downward, the trunnions moving upward in the slots 8 and the body rocking on the curved upper surface 3 of the side bars. As the end of the body reaches the ground the trunnions will simultaneously engage with the end walls of the slot 8 and therefore prevent any sudden jar or hard pounding of the body upon the ground.

In Figs. 2 and 5 I have shown the side bars of the frame as made in the form of hollow castings 12, having at the forward portion and at the under side lugs 13, between which the cross-bars 14, mounted on the platform 15, are secured. The rear upper end of each hollow casting or side bar 12 is curved downward, as at 16, and formed integral with this casting or side bar is an offset 17, having a horizontally-disposed guide-slot 18 and the upwardly and rearwardly curved guide-slot 19. These slots have the same relation to the rear axle as in the construction first described and the trunnions move therein in the same manner. In this example I employ a spring connection between the axle 2 and the hollow castings or side bars of the frame. Each spring 20 is made up of several leaves which are secured in the rear portion of the castings, these portions of the castings being open at the bottom to receive the springs. The top of the upper leaf of each spring engages with a block 21, arranged between it and the top wall of the casting, and the spring is held in place by means of loop-bolts 22, having their respective upwardly-extended threaded ends passed through lugs 23 24, formed on the casting and engaged above said lugs by nuts 25. The rear portion of the spring 20 is curved downward and is mounted to slide upon the upper side of the axle 2, and the said rear end has a swinging connection relatively to the casting. As here shown, this swinging connection consists of links 26, pivoted to the casting and through which a bolt 27 extends, the said bolt being also extended through an eye 28, formed at the end of the lower leaf of the spring.

In Fig. 3 I have shown the body 29 as provided with an upwardly and rearwardly inclined rear end, and in this instance the casting 30 is attached to the rear curved end of each side bar 1, as in the first example described. However, the horizontally-disposed guide-slot 7 is omitted, the said guide-slot being unnecessary, because the body has no longitudinal sliding movement. The vertically and rearwardly inclined slot 31, however, is arranged in an offset 32 and has its lower portion forward of the axle 2.

In Figs. 7 anp 8 I have shown two-wheeled vehicles or carts, the rear portions of the shafts forming the frame thereof, the rear ends of these shafts 33 being curved downward, as at 34. In these examples castings 35 are secured to the side bars or shafts, and each casting has an offset 36, which is curved upward and rearward and is provided with a guide-slot to receive the trunnions extended from the body of the vehicle. In these examples after releasing the front portion of the body from the frame the body will tilt downward, as indicated by dotted lines, and while so tilting will rock on the curved portions 34, but will be prevented from sliding thereon by the guides; also, it is obvious that the fulcrum-point on said curved surfaces 34 will be constantly changed during the dumping action.

I will now describe a simple means by which the longitudinally-movable bodies may be easily moved. This means consists of a rack-bar 37, mounted to slide in a casing 38, secured to a platform on the front portion of the vehicle-frame. Extended from one of the side pieces of the casing 38 are cheek-pieces 39 40, between which a segment-gear 41 is mounted to rotate. This segment-gear is designed to have its teeth project through an opening in the side wall of the casing and engage with the teeth of the rack 37. This segment-gear is mounted to oscillate on a bolt or pin 42, and also mounted to move on this bolt or pin 42 is an outwardly-extended lever 43, and pivotally connected to the lever 43 is a dog consisting of two divergent arms 44 45, adapted to be placed in engagement with shoulders 46, 47, 48, and 49. At its inner end the rack-bar 37 has an upwardly-extended hook portion 50, adapted to engage in a keeper 51, attached to the front end of the vehicle-body.

In operation when it is desired to move the vehicle-body rearward the section 45 of the dog is to be placed in engagement with the shoulder 48. Then by shifting the lever in the direction of the arrow $a$ (shown in Fig. 9) the rack-bar 37 will be moved a distance, and consequently the vehicle-body will be moved the same distance, which may be about one-half the desired movement. After moving it thus far the lever is to be moved back and the section 45 of the dog engaged with the shoulder 49, and then the lever is to be again moved in the direction of the arrow $a$, when the body will be moved to its extreme rearward position—that is, with its trunnions at the junction of the guide-slots 7 and 8. As during the rearward movement of the body and as the forwardly-extended portion of the hook 50 is somewhat shorter than is the opening through the keeper 51 the body may be tilted to dump the load, as the keeper 51 will move over the hook. After dumping the load the vehicle-body is to be turned back to its horizontal position, and then the gear 41 is to be rotated in the direction opposite to that before described, with the section 44 of the dog engaged first with the shoulder 46 and then with the shoulder 47. This will draw the body forward and engage the hook with the keeper 51 and prevent the accidental tilting of the body. By this shifting mechanism it is obvious that but a very slight power will be required to move the body of the vehicle to either of its positions.

It will be seen that by my invention in connecting the body with a frame there will be an upward and downward rolling movement of the body both at the same time. It will also be seen that in the act of dumping the greater portion of the weight of the load is on the upper curved bearing forward of the axle of the vehicle until the load is finally dumped. Therefore the upwardly and rearwardly curved guide forms a definite compensating balance, so that after dumping a load the body may be returned to its normal carrying position by the expenditure of very little, if any, power of the operator.

Having thus described my invention, I claim as new and desire to secure by Letters Patent—

1. In a dumping-vehicle, a frame having its side portions curved downward at the rear end on the upper side, offsets from said rear portions provided with upwardly and rearwardly inclined guide-slots, the said guide-slots being forward of the axle, to which the frame is attached, and trunnions extended from the vehicle-body into said guide-slots, substantially as specified.

2. In a dumping-vehicle, a frame comprising side bars curved downward at the upper sides of the rear end, an offset extended from each side bar, the said offset having a horizontally-disposed guide-slot and an upwardly and rearwardly disposed guide-slot forming a junction with the first-named guide-slot, the said guide-slots being forward of the axle, a dumping-body, and trunnions extended from said body and adapted to move in the guide-slots, substantially as specified.

3. In a dumping-vehicle, a frame comprising side bars, each consisting of a hollow casting having its rear end curved downward at the upper side, an offset formed on said casting near its rear end, the said offset having a horizontally-disposed guide-slot and an upwardly and rearwardly curved guide-slot, a body, trunnions on the body adapted to move in the guide-slots, a spring arranged in each side bar or hollow casting and mounted to slide on the axle of the vehicle, and link connections between the casting and the rear ends of the spring, substantially as specified.

4. In a dumping-vehicle, a frame side bar consisting of a hollow casting, an offset on said casting provided with a guide-slot, the said casting being curved on its upper side rearward of the offset, a leaf-spring seated in the hollow casting, loop-bolts engaging said spring and passing through lugs formed on the casting and secured by nuts, and link connections between the rear end of the spring and the casting, substantially as specified.

5. In a dumping-vehicle, a frame side bar curved downward at its rear end, and an offset on the side bar forward of said curved portion, the said offset being provided with a curved guide-slot closed at its outer side, substantially as specified.

6. In a dumping-vehicle, a frame side bar consisting of a hollow casting curved downward at its rear end, an offset on said casting forward of its curved portion, said offset being provided with a curved guide-slot, a spring secured to the said casting, and lugs extended downward from the forward portion of the casting, substantially as specified.

7. A device for moving the body of a dumping-vehicle, comprising a longitudinally-movable rack-bar having a pin to engage with a keeper on the body, a segment-gear engaging with said rack, a lever mounted to swing on the pivot of the gear, and a dog pivoted to the lever and having divergent members for engaging with shoulders formed on the gear, substantially as specified.

8. A device for moving the body of a dumping-vehicle, comprising a rack-bar having a pin to engage with a keeper on the body of the vehicle, a casing in which said rack-bar is mounted to move, a segment-gear having its teeth engaging with the rack-bar, a lever mounted to swing on the pivot of the gear, and a dog pivoted to said lever and having two divergent members to engage with shoulders formed on the gear, substantially as specified.

THOMAS HILL.

Witnesses:
 JNO. M. RITTER,
 C. R. FERGUSON.